United States Patent [19]

Woodbury

[11] 4,207,510
[45] Jun. 10, 1980

[54] CONTROL METHOD AND MEANS FOR EFFICIENT OPERATION OF BRUSHLESS D-C MOTORS OVER A WIDE RANGE OF OPERATING CONDITIONS

[75] Inventor: James R. Woodbury, Los Altos, Calif.

[73] Assignee: SRI International, Menlo Park, Calif.

[21] Appl. No.: 869,953

[22] Filed: Jan. 16, 1978

[51] Int. Cl.² .................................................. H02P 5/40
[52] U.S. Cl. ...................................... 318/802; 318/811
[58] Field of Search .............. 318/227, 230, 231, 802, 318/803, 811

[56] References Cited

U.S. PATENT DOCUMENTS

| | | | |
|---|---|---|---|
| 3,512,067 | 5/1970 | Landau | 318/230 X |
| 3,694,718 | 9/1972 | Graf et al. | 318/227 |
| 3,775,652 | 11/1973 | Bowler et al. | 318/227 |
| 3,909,687 | 9/1975 | Abbondanti | 318/227 |
| 4,001,660 | 1/1977 | Lipo | 318/227 |

Primary Examiner—Gene Z. Rubinson
Attorney, Agent, or Firm—Victor R. Beckman

[57] ABSTRACT

Method and apparatus for efficient operation of a brushless d-c motor are shown. A brushless d-c motor comprises, essentially, a motor drive source, such as a d-c to a-c converter, in combination with a conventional brushless a-c machine. Generally, the brushless a-c machine includes a polyphase stator for the production of a rotating electric field, and a rotor that produces mechanical power from the rotating field without the need for sliding electrical contacts. For induction motors, the rotor phases are short-circuited and rotor currents are produced by allowing the rotor to "slip" with respect to the rotating stator field, the resulting flux variations in the rotor thereby inducing rotor currents. Motor speed is controlled by frequency control of the a-c output from the motor drive source. The present arrangement includes an efficiency controller responsive to motor input current and voltage for producing a first signal related to motor impedance, and a second signal related to motor impedance required for maximum motor operating efficiency. The difference between said first and second impedance related signals is used to control the motor input voltage for efficient motor operation over a wide range of operating speeds and torques.

11 Claims, 9 Drawing Figures

CONTROL METHOD AND MEANS FOR EFFICIENT OPERATION OF BRUSHLESS D-C MOTORS OVER A WIDE RANGE OF OPERATING CONDITIONS

BACKGROUND OF THE INVENTION

This invention relates to electronic control system method and means to provide for optimum induction motor operating efficiency over a wide range of motor speeds and torques.

Typically, induction motors are designed for optimum operating efficiency at some given, or normal, operating speed and load. For variable speed operation and varying torque requirements, the a-c frequency and voltage supplied to the motor windings may be controlled so as to optimize certain operating characteristics over a range of motor load and speed requirements. Numerous such arrangements are known as shown, for example, in U.S. Pat. Nos. 3,896,356; 3,860,858; 3,851,234; and 3,863,121. However, prior art arrangements often employ special speed, torque or angle sensing devices for use in the control circuitry which devices add considerable expense to the system.

SUMMARY OF THE INVENTION

An object of this invention is the provision of an allelectric control system for a brushless a-c machine which automatically controls the input voltage to the machine for optimum efficiency of machine operation over a wide range of machine loads and operating speeds.

An object of this invention is the provision of a control system for a brushless a-c motor for optimizing the operating efficiency thereof over a wide range of speed and motor loads without the need for speed, torque or angle sensing transducers, or the like, which add considerably to the cost thereof.

The above and other objects and advantages of this invention are achieved by driving an a-c motor by means of a variable frequency and variable amplitude drive signal, the frequency of which drive signal is controlled for control of the motor speed. In accordance with the present invention, a motor efficiency controller responsive to motor input current and voltage is provided for producing signals related to actual motor input impedance and to the ideal motor impedance required for maximum motor operating efficiency. Motor impedance here refers to the electrical input impedance. The difference between said impedance related signals is used to control the amplitude of the drive signal to maximize the efficiency of motor operation over a wide range of motor speeds and loads.

The invention will become apparent from the following detailed description when considered with the accompanying drawings wherein like reference characters refer to the same parts in the several views.

Following is a list of abbreviations employed herein.

Figure 3:
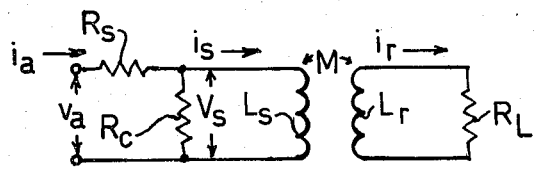
FIG. 3 is a transformer model, equivalent circuit, representing one phase of an induction motor.

| | |
|---|---|
| $A_c$ | Winding cross-sectional area. |
| $B_T$ | Total amplitude of flux density in stator. |
| $\delta$ | $1 - k^2$ |
| $i_a$ | Motor input current per phase. |
| $i_r$ | Rotor current per phase. |
| $i_s$ | Stator current as identified in the transformer equivalent of one phase of an inductor motor. |
| $I_a, I_r, I_s$ | Amplitude of $i_a, i_r, i_s$. |
| $K_1$ | Electromechanical conversion constant (1 in MKS units, 141.7oz. in./watt sec. in English units). |
| $k$ | Rotor-stator coupling coefficient per phase $= \dfrac{M}{\sqrt{L_r L_s}}$ |
| $L_r$ | Rotor inductance per phase with stator winding open circuit. |
| $L_s$ | Stator inductance per phase with rotor winding open circuit. |
| $M$ | Rotor-stator mutual inductance per phase. |
| $N$ | Number of pole pairs. |
| $n$ | Number of phases (same for rotor and stator). |
| $v_a, v_s$ | Motor applied voltages per phase; see FIG. 3. |
| $v_b$ | Stator back-EMF voltage. |
| $\eta$ | Motor efficiency. |
| $n_r, n_s$ | Number of turns per rotor phase and stator phase, respectively. |
| $P_m$ | Rotor mechanical output power. |
| $P_L$ | Total motor power loss per phase. |
| $P_{Lr}$ | Rotor power loss per phase. |
| $P_r$ | Power into the rotor per phase. |
| $R_c$ | Stator core loss resistance per phase. |
| Re | Indicates real part of following expression. |
| $R_L$ | Secondary load resistance equivalent to the mechanical load. |
| $R_r$ | Rotor copper loss resistance per phase. |
| $R_s$ | Stator copper loss resistance per phase. |
| $T$ | Rotor output torque. |
| $V_a, V_b, V_s$ | Amplitude of $v_a, v_b, v_s$. |
| $\omega$ | Motor input radian frequency. |
| $\omega_a, \omega_c, \omega_r$ | $R_s/L_s, R_c$ |
| $L_s, R_r/L_r$ | |
| $\omega_H, \omega_L$ | Upper and lower end of high-efficiency range of induction motor. |
| $\omega_m$ | Motor shaft radian frequency times N. |
| $\omega_s$ | $\omega - \omega_m$. |
| $\phi_t$ | Total amplitude of flux coupling the stator due to rotor currents. |
| $Z_s$ | $v_s/i_s$. |

Figure 1:
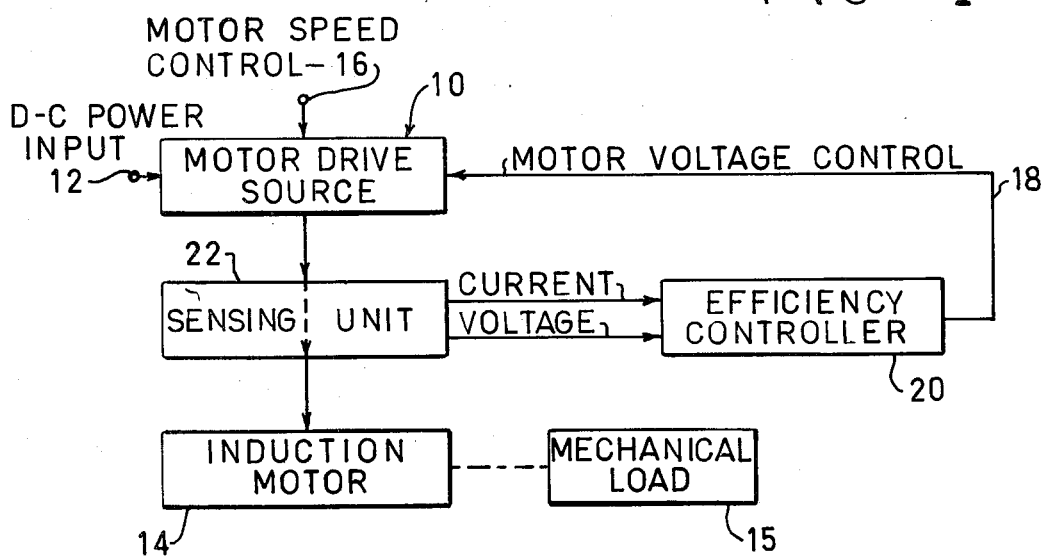
FIG. 1 is a simplified block diagram of an induction d-c brushless motor control system incorporating the present invention.
Figure 2:
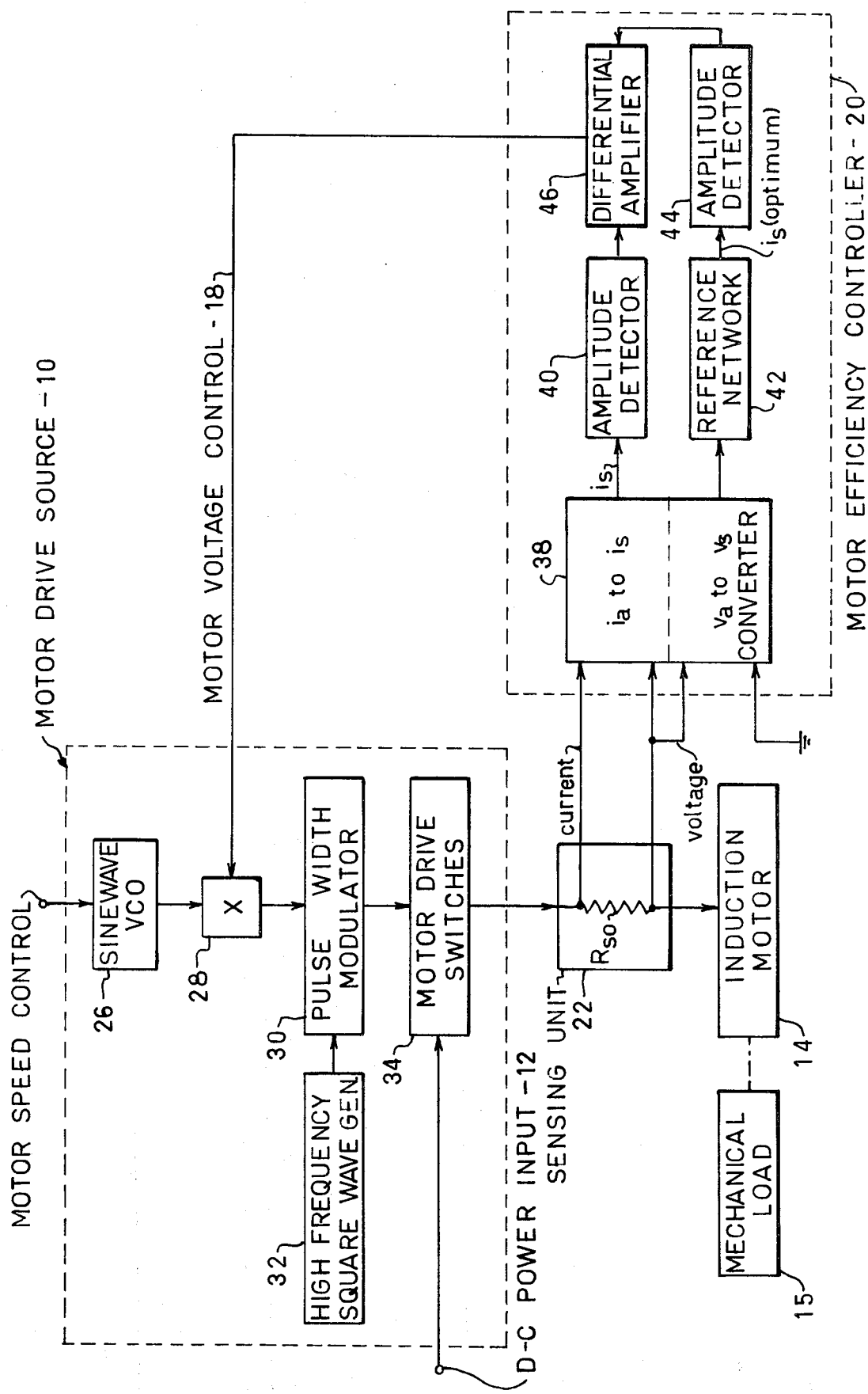
FIG. 2 is a block diagram which is similar to FIG. 1 but showing the invention in greater detail.

Reference first is made to FIG. 1 wherein there is shown in simplified block diagram form a system of motor control embodying the present invention. The system includes a motor drive source 10, which may be of conventional design, for converting d-c power input thereto at terminal 12 to a variable frequency and amplitude output which is supplied to the primary windings of an induction motor 14, which also may be of conventional design. In FIGS. 1 and 2 the motor is shown driving a mechanical load 15. As is well understood, the alternating current drive source supplied to the motor primary windings (generally the stator windings) produce a rotating electric field which induces currents in a polyphase secondary winding (generally the rotor) to produce a second electric field, and rotation of the rotor.

The frequency and amplitude of the a-c output from the motor drive source 10 are controlled by speed control and motor amplitude control signals supplied to the drive source at the motor speed control terminal 16 and the motor voltage control line 18, respectively. The speed control terminal is connected to a suitable adjustable supply source, not shown, for control of the motor speed. The voltage control line 18, on the other hand, is connected to the output from a motor efficiency controller 20 included in the motor control system for control of the motor input voltage for maximum motor operating efficiency over wide ranges of motor operating speed and load.

The efficiency controller 20 is responsive to motor input current and voltage signals supplied thereto from sensing means 22 included in the connection of the motor drive source 10 to the motor 14. The motor input current and voltage signals provide a measure of the motor impedance. The motor input voltage is also supplied to an active reference network included in the controller 20, which network has an amplitude versus frequency characteristic such that the output therefrom provides a measure of the motor impedance required for maximum efficiency of operation. The difference between said motor impedance and optimum motor impedance signals is supplied over voltage control line 18 to the motor drive source 10 for controlling the motor input voltage to minimize the difference, thereby maximizing the operating efficiency.

Reference now is made to FIG. 2 wherein a block diagram of the invention in somewhat greater detail than that of FIG. 1 is shown. For purposes of illustration, and not by way of limitation, a pulsewidth modulated inverter type motor drive source 10 is shown for supplying the motor with a variable frequency and variable amplitude drive voltage. The source is shown to include a low frequency voltage controlled sinewave oscillator 26 to which the motor speed control signal is supplied for control of the oscillator frequency. The oscillator output together with the motor voltage control signal from the controller 20 are supplied to a multiplier circuit 28 for amplitude control of the oscillator output in accordance with the motor voltage control signal. The output is sinusoidal for maximum efficiency.

The frequency and amplitude controlled output from the multiplier 28 is supplied to a pulse width modulator 30 as a modulating signal for pulse width (duration) modulation of a high frequency square wave carrier signal fed to the modulator from a square wave generator 32. Pulses of generally sinusoidally varying width from the pulse width modulator are supplied as switching signals to motor drive switches 34. The motor drive switches 34 commonly comprise large capacity switching transistors, or the like, capable of high speed operation, through which switches D-C power is supplied to the induction motor 14. With the illustrated motor drive 10 the duty cycle of the switching signals from the pulse width modulator 30 is sinusoidally varied in accordance with the output from the voltage controlled oscillator 26. The frequency of this sinusoidal variation determines motor speed while the average value of the duty cycle is controlled by the output from the controller 20 for motor voltage amplitude control. Other variable frequency and amplitude motor drive sources are well known and may be employed in the motor control system of the present invention. A tutorial review of motor drive sources is included in an article entitled Solid-State Control of Electric Drives by R. G. Schieman et al, Proceedings of the IEEE, Vol. 62, No. 12, December 1974, pages 1643 to 1660.

In accordance with one aspect of the present invention the controller 20 is responsive to the electrical input to the induction motor 14 for the production of a first signal related to motor impedance and a second signal related to motor impedance required for maximum motor operating efficiency under existing torque and speed requirements. A signal related to motor impedance is obtained from a measure of actual motor current and voltage. A signal related to optimum motor impedance is derived from the voltage obtained, for example, by direct connection to the motor input. Any suitable means may be used for sensing motor current and in FIG. 2 the sensing means 26 for such purpose is shown comprising a small resistor $R_{so}$ in series circuit with the motor winding whereby the voltage developed across the resistor provides a measure of the motor input current. Other current measuring means such as induction (transformer) coupling to a motor input lead may be used.

Figure 6A:
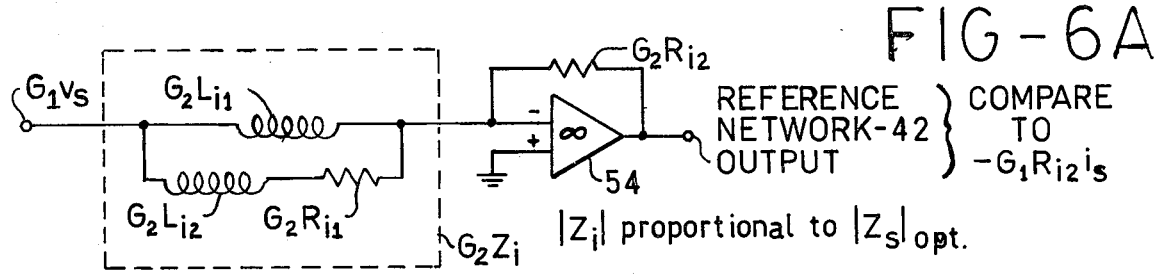
Figure 6B:
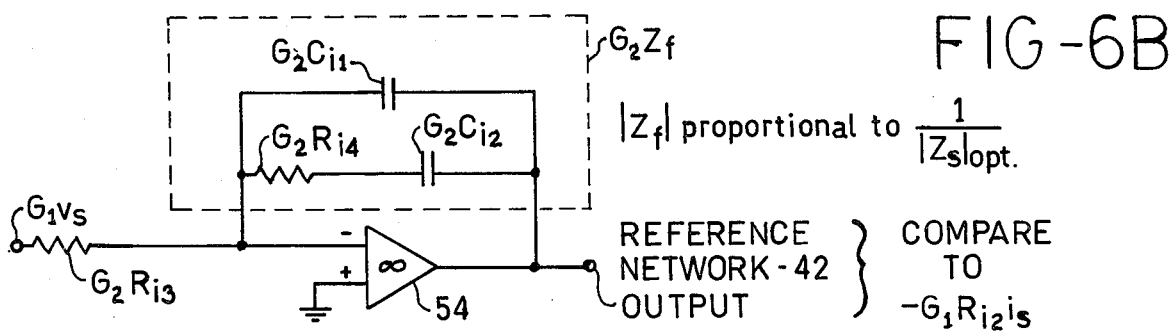

In the embodiment of the invention illustrated in FIG. 2 the motor input current and voltage signals from the sensing unit 26 are supplied to $i_a$ to $i_s$ and $v_a$ to $v_s$ sections, respectively, of a converter 38 included in the controller 20. the current $i_a$ and voltage $v_a$ represent the respective motor input current and voltage per phase, whereas the current $i_s$ and voltage $v_s$ are those present in an equivalent motor circuit illustrated in FIG. 3, described below. In FIG. 2, the converter 38 outputs $i_s$ and $v_s$ are shown applied to an amplitude detector 40 and an active reference network 42, respectively. Circuit diagrams of networks which may be employed in the arrangement are shown in FIGS. 6A and 6B, and described below. For present purposes it will be understood that the network 42 output is substantially proportional to the ideal or optimum value of $i_s$, i.e. $i_s$(optimum), for optimum induction motor operation. The reference network output $i_s$(optimum) is supplied to an amplitude detector 44. Outputs $I_s$ and $I_s$(optimum) from amplitude detectors 40 and 44, respectively, are supplied to a differential amplifier 46, and the differential amplifier output is supplied over line 18 to the motor drive source for controlling the duty cycle thereof. If the motor current $i_s$ exceeds the reference current $i_s$(optimum), the average duty cycle is increased, effectively increasing the amplitude of the voltage fundamental applied to the induction motor. The increase in applied voltage, for a given input frequency, will decrease the slip frequency, and thereby increase the motor input impedance. The increase in motor input impedance reduces the motor current signal $i_s$ with reference to the reference signal $i_s$(optimum), although both signals are larger than before, and a new equilibrium is reached. This feedback control system is typically stable at high frequencies without additional phase control networks because the mechanical time constant of the motor 14 and load 15 produce a simple 6 dB per octave rolloff in the feedback loop.

As noted above, the voltage $v_s$ and current $i_s$ are those present in an equivalent motor circuit illustrated in FIG. 3 to which Figure reference now is made. The equivalent motor circuit shown therein comprises a transformer circuit in which M represents the rotor-stator mutual inductance per phase, and $L_s$ and $L_r$ represent the stator and rotor inductances per phase, with the respective rotor and stator windings open circuited. $R_s$ and $R_c$ represent the stator copper and core loss resistances per phase, respectively. It will be noted that the equivalent primary currents and voltages are the actual stator voltages ($v_a$) and currents ($i_a$), and the secondary current ($i_r$) is the current in one phase of the rotor. However, the unidentified induced voltage in the equivalent circuit secondary does not equal the voltage induced in a rotor phase. $R_L$ represents the secondary load resistance equivalent to the mechanical load 15. The power output of the equivalent circuit, which corresponds to the mechanical power output per phase of the motor, neglecting windage and friction, is:

$$\frac{P_m}{n} = P_r - P_{Lr} = \frac{I_r^2}{2}(R_L - R_r) \quad (1)$$

where: n is the number of phases (n=2 in this case).

The stator back-EMF voltage, $v_b$, expressed in complex notation, is:

$$v_b = \frac{\omega \omega_s M^2 i_s}{R_r + j\omega_s L_r}, \quad (2)$$

Equation (2) may be derived from a direct analysis of the induction motor circuit, and is precisely the equation for the back-EMF voltage induced in the primary of the transformer of the equivalent circuit of FIG. 3 with applied frequency $\omega$ and a secondary load resistance:

$$R_L = R_r \frac{\omega}{\omega_s}. \quad (3)$$

The following analysis of the transformer equivalent circuit of FIG. 3 provides an indication of motor operating conditions for optimum efficiency. For convenience the following definitions are used:

$$\omega_r = \frac{R_r}{L_r} \quad (4a)$$

$$\omega_a = \frac{R_s}{L_s} \quad (4b)$$

$$\omega_c = \frac{R_c}{L_s} \quad (4c)$$

$$k = \frac{M}{\sqrt{L_s L_r}} \quad (4d)$$

$$\delta = 1 - k^2 \quad (4e)$$

Analysis of the equivalent circuit of FIG. 3 gives the following results:

$$Z_s = \frac{v_s}{i_s} = j\omega L_s \left[ \frac{1 + j\delta \frac{\omega_s}{\omega_r}}{1 + j \frac{\omega_s}{\omega_r}} \right]. \quad (5)$$

The power per phase into the rotor is:

$$P_r = \frac{V_s}{2} Re\left\{\frac{V_s}{Z_s}\right\} = \frac{k^2 V_s^2}{2\omega L_s \left(\frac{\omega_r}{\omega_s} + \delta^2 \frac{\omega_s}{\omega_r}\right)}. \quad (6)$$

The mechanical power output of the rotor is:

$$P_m = \frac{\omega_m T}{NK_1}, \quad (7)$$

where $K_1$ is the appropriate electromechanical conversion constant. From (1) and (3) it follows that:

$$\frac{P_m}{nP_r} = 1 - \frac{\omega_s}{\omega} = \frac{\omega_m}{\omega}, \quad (8)$$

and that the rotor loss is given by:

$$\frac{P_{Lr}}{P_r} = \frac{\omega_s}{\omega} \quad (9)$$

The efficiency of a motor is given by:

$$\eta = \frac{1}{1 + \frac{P_L}{P_m}} \quad (10)$$

where $P_L/P_m$ is the motor loss-to-power-output ratio. Due to the fact that this loss ratio is a more sensitive measure of motor performance than efficiency, we will concentrate our attention upon it. However, efficiency can always be obtained from it by the use of (10). The motor loss-to-power-output ratio, assuming $R_c \gg R_s$, is:

$$\frac{P_L}{P_m} = \frac{n\left(\frac{V_s^2}{2R_c} + \frac{I_s^2 R_s}{2} + P_{Lr}\right)}{P_m}. \quad (11)$$

Combining (6) and (8) we obtain an equation for $V_s$ as a function of $\omega_s$, given the mechanical output power:

$$\left(\frac{V_s}{\omega}\right)^2 = \frac{2L_s P_m}{k^2 n \omega_m}\left(\frac{\omega_r}{\omega_s} + \delta^2 \frac{\omega_s}{\omega_r}\right). \quad (12)$$

Applying (5), (8), (9), and (12) to (11) gives an equation for the motor loss ratio that involves only the fixed motor parameters and $\omega$ and $\omega_s$, and is independent of $P_m$ (and, therefore, of motor load torque):

$$\frac{P_L}{P_m} = \frac{1}{k^2 \omega_m \omega_c}\left[\frac{\omega_s}{\omega_r}\delta^2(\omega^2 + \omega_H^2) + \frac{\omega_r}{\omega_s}(\omega^2 + \omega_L^2)\right]. \quad (13)$$

where the upper end of high-efficiency range of induction motor is:

$$\omega_H = \frac{1}{\delta}\sqrt{\omega_c(\omega_a + k^2 \omega_r)}, \quad (14)$$

and the lower end of high-efficiency range of induction motor is:

$$\omega_L = \sqrt{\omega_a \omega_c} \quad (15)$$

In general the given parameters are the mechanical output requirements, $\omega_m$ and $P_m$ (or motor output torque, T). therefore, the input frequency, $\omega$, is in fact a variable function of $\omega_s$. However, (13) may be optimized with respect to $\omega_s$ by assuming that $\omega$ is constant, because for large values of $\omega_m$, $\omega \approx \omega_m$, and for small values of $\omega_m$ the $\omega$ terms in (13) are small, because $\omega^2 << \omega_L^2 << \omega_H^2$. The resulting optimum value of $\omega_s$ is given by:

$$\left.\frac{\omega_s}{\omega_r}\right|_{opt\omega_s} = \frac{(\omega^2 + \omega_L^2)^{\frac{1}{4}}}{\delta(\omega^2 + \omega_H^2)^{\frac{1}{4}}}. \quad (16)$$

The optimum value of the loss ratio is then:

$$\left.\frac{P_L}{P_m}\right|_{opt\omega_s} = \frac{2\delta}{k^2\omega_m\omega_c}(\omega^2 + \omega_L^2)^{\frac{1}{2}}(\omega^2 + \omega_H^2)^{\frac{1}{2}}. \quad (17)$$

In a machine with good coupling between stator and rotor ($k \approx 1$, $\delta << 1$), $\omega_L$ is much less than $\omega_H$, and (17) shows that the loss-to-output-power ratio will be within about 1.5 dB of the best possible value over the speed range $\omega_L < \omega_m < \omega_H$, again assuming $\omega \approx \omega_m$. Typically, a speed range of twenty to one can be expected for near optimum performance if the applied voltage is adjusted to give optimum slip speed for each output condition. The proper value of $V_s$ can be determined by substituting (16) into (12).

Figure 4:
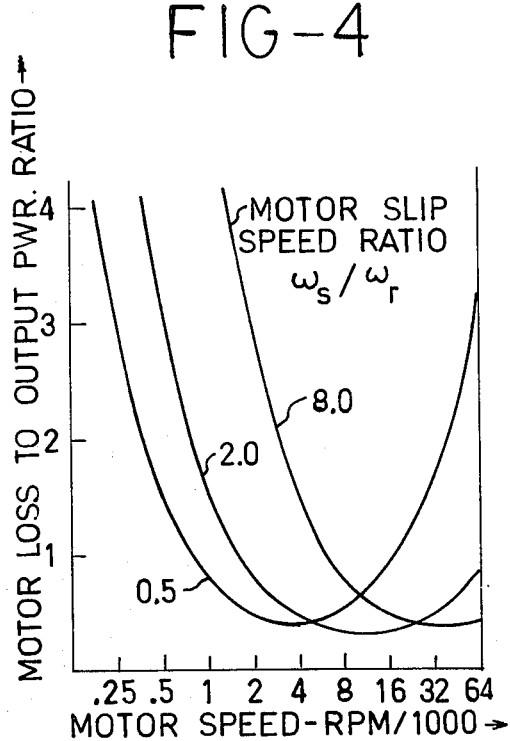
FIG. 4 is a graph showing the loss-to-power-output ratio for three values of constant slip speed for a typical fractional-horsepower induction motor.

FIG. 4 shows loss-to-output-power ratio for three different values of constant slip speed for a typical fractional horsepower motor. Obviously there is no fixed value of slip speed that will be optimum for all motor speeds. Optimum motor performance is given by the envelope of all such constant slip speed curves. This performance can be achieved by controlling slip speed according to the formula given in (16). This assumes that the motor load torque is low enough so that the required value of $\omega_s$ can be achieved without saturating the motor core.

The apparent dependence of the loss ratio upon the coupling parameter. $\omega$, in (17) is deceiving. Typically, due to windage, friction, and bearing limitations, induction motor speeds must be limited to speeds considerably below $\omega_H$. Assuming $\omega^2 << \omega_H^2$, (14) and (17) give:

$$\left.\frac{P_L}{P_m}\right|_{\substack{opt\,\omega_s \\ \omega^2 << \omega_H^2}} \approx \frac{2}{k^2\omega_m}\left(\frac{\omega_a + k^2\omega_r}{\omega_c}\right)^{\frac{1}{2}}(\omega^2 + \omega_L^2)^{\frac{1}{2}}, \quad (18)$$

which is independent of $\delta$, and therefore tight coupling is not as critical to efficiency in the induction motor as it can be in some transformer applications.

Note that in this case the loss-to-output-power ratio, and therefore the machine efficiency, is independent of $P_m$, and therefore independent of output torque. This is only true to the extent that (12) can be achieved at the optimum value of $\omega_s$ without saturating the motor core. The stator flux density, assuming a uniform distribution under the winding, is:

$$B_T = \frac{\phi_t}{A_c} = \frac{V_s}{n_s A_c \omega}, \quad (19)$$

where:
$A_c$ is the winding cross-sectional area.

Therefore, combining (7), (12), and (19), the rotor output torque is:

$$T = \frac{nNK_1(B_T n_s A_c k)^2}{2L_s\left(\frac{\omega_r}{\omega_s} + \delta^2\frac{\omega_s}{\omega_r}\right)}. \quad (20)$$

Given a maximum allowable peak flux density, $B_T$, (20) will determine the maximum output torque that can be achieved as a function of $\omega_s$. Equation (16) shows that the optimum value of $\omega_s/\omega_r$ increases rapidly with $\omega$ for $\omega_L < \omega < \omega_H$, and therefore the maximum torque for optimum efficiency increases rapidly in this range. This points up the fact that if an induction machine is to be operated efficiently at high torques, it must be run at high speeds.

The optimum slip speed at input frequencies much below $\omega_L$ is given by:

$$\left.\frac{\omega_s}{\omega_r}\right|_{\substack{opt\,\omega_s \\ \omega^2 << \omega_L^2}} \approx \frac{\omega_L}{\delta\omega_H} = \frac{1}{\left(1 + k^2\frac{\omega_r}{\omega_a}\right)^{\frac{1}{2}}}, \quad (21)$$

so that $\omega_s < \omega_r$ at low speeds. Assuming $\delta^2 << 1$, (20) then becomes:

$$\left.T\right|_{\substack{opt\,\omega_s \\ \delta^2 << 1 \\ \omega^2 << \omega_L^2}} = \frac{nNK_1(B_T n_s A_c k)^2}{2L_s\left(1 + k^2\frac{\omega_r}{\omega_a}\right)^{\frac{1}{2}}} \quad (22)$$

Because $L_s$ is proportional to $n_s^2 A_c$, we see that, given a maximum flux density, the maximum torque achievable with optimum efficiency at low speeds varies in proportion to $nNA_c$, which is the active area of the air gap. This implies that to achieve high efficiency with low weight, a low-speed, high-torque motor should be axially long relative to its diameter. Note from (20) that torque levels much higher than that indicated by (22) can be achieved at low speeds with a given flux density, $B_T$; however, the slip frequency used must be much larger than the optimum given by (16).

CONTROL METHOD FOR THE INDUCTION ROTOR

For the reasons mentioned above, in what follows we will concentrate our attention upon the induction rotor. For optimum efficiency the induction rotor must be controlled by a proper selection of the drive voltage amplitude and frequency for each condition of load, as shown above. If special speed, torque, or angle sensors, which may add considerable expense to the system, are to be avoided, the proper applied voltage must be determined from parameters that are easily measured electrically at the motor input. Generally speaking, it is not difficult to measure input current, and from the input current ($i_a$) and voltage ($v_a$), $v_s$ and $i_s$ can be determined:

$$v_s = v_a - i_a R_s, \quad (23)$$

$$i_s = i_a - v_s/R_c = i_a\left(1 + \frac{R_s}{R_c}\right) - \frac{v_a}{R_c} \approx i_a - \frac{v_a}{R_c} \quad (24)$$

Figure 5:
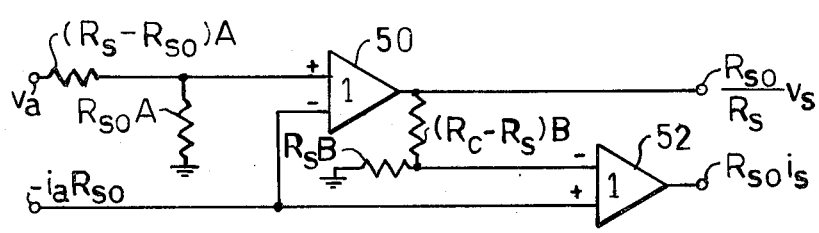
FIG. 5 is a detailed block diagram of the $v_a$ to $v_s$ and $i_a$ to $i_s$ converter shown in FIG. 2, FIG. 6A and 6B show equivalent detailed circuit diagrams for use as the reference network shown in FIG. 2, and FIG. 7A and 7B show equivalent networks which may be substituted for the $v_a$ to $v_s$ and $i_a$ to $i_s$ converter and reference network shown in FIG. 2 for performing approximately the same functions thereof.

FIG. 5 illustrates a circuit for obtaining voltages proportional to $v_s$ and $i_s$ which circuit may be employed as the converter 38 shown in FIG. 2. As noted above, the input voltage $i_a R_{so}$ is generated by putting a small resistor, $R_{so}$, in series with motor winding. A and B are constants that may be chosen to suit circuit impedance requirements. The illustrated circuit includes first and second unity gain differential amplifiers 50 and 52, having outputs related to the equivalent circuit voltage $v_s$ and current $i_s$, respectively. A more practical approximate method of accounting for the effects of $R_s$ and $R_c$ will be discussed below; however, the circuit of FIG. 5 is given to show that the recommended techniques that follow can be realized in a completely general way.

REALIZATION OF THE CONTROL METHOD

By inserting the optimum slip frequency from (16) into (5) there is obtained a formula for the magnitude of $Z_s$ for optimum efficiency:

$$|Z_s|_{opt} = \omega L_s \left( \frac{\omega^2 + \frac{\omega_L^2 + \omega_H^2}{2}}{\omega^2 + \frac{\omega_L^2 + \delta^2 \omega_H^2}{1+\delta^2}} \right)^{\frac{1}{2}} \left( \frac{2\delta^2}{(1+\delta^2)} \right)^{\frac{1}{2}} \quad (25)$$

Note that this is independent of load torque.

A voltage proportional to $v_s$, derived, for example, as shown in FIG. 5 described above, can be applied to a network that has the same amplitude versus frequency characteristic as that of (25). The resulting current amplitude will then be proportional to the ideal amplitude of $i_s$. This can be compared to the actual amplitude of $i_s$, again derived, for example, as shown in FIG. 5, to obtain the motor voltage control signal. A network, which includes an operational amplifier 54, that can be used to generate the ideal $i_s$ signal in this fashion is shown in FIG. 6A. $G_1$, $G_2$, and $R_{i2}$ may be selected to give convenient circuit impedance and voltage levels. The following equations are used for calculating values for components shown in the FIG. 6A arrangement.

$$|Z_i| = \frac{\omega L_{i1} L_{i2}}{L_{i1} + L_{i2}} \left( \frac{\omega^2 + \frac{R_{L1}^2}{L_{i2}^2}}{\omega^2 + \frac{R_{i1}^2}{(L_{i1}+L_{i2})^2}} \right)^{\frac{1}{2}} \quad (26A)$$

$$L_{i2} = \frac{L_s k_2}{1 - \frac{L_s}{L_{i1}} k_2} \quad \frac{R_{i1}}{L_{i2}} = \left( \frac{\omega_L^2 + \omega_H^2}{2} \right)^{\frac{1}{2}} \quad (26B)$$

$$\frac{L_{i1}}{L_s} = \left( \frac{\omega_L^2 + \omega_H^2}{\frac{\omega_L^2}{\delta^2} + \omega_H^2} \right)^{\frac{1}{2}} \quad (26C)$$

$$k_2 = \left( \frac{2\delta^2}{1+\delta^2} \right)^{\frac{1}{2}} \quad (26D)$$

The circuit of FIG. 6B is another example of an active network that will produce the desired reference network signal. The following equations are given for calculating the component values for FIG. 6B from those of FIG. 6A.

$$|Z_f| = \frac{1}{\omega C_{i1}} \left( \frac{\omega^2 + \frac{1}{|R_{i4}C_{i2}|^2}}{\omega^2 + \frac{1}{R_{i4}^2}\left(\frac{1}{C_{i1}} + \frac{1}{C_{i2}}\right)^2} \right)^{\frac{1}{2}} \quad (27A)$$

$$\frac{1}{R_{i4}C_{i1}} = \frac{R_{i1} L_{i1}}{L_{i2}(L_{i1}+L_{i2})} \quad (27B)$$

$$\frac{1}{R_{i4}C_{i2}} = \frac{R_{i1}}{L_{i1}+L_{i2}} \quad (27C)$$

$$\frac{Z_f}{R_{i3}} = \frac{R_{i2}}{Z_i} \quad (27D)$$

$$C_{i1} = \frac{L_{i1} L_{i2}}{R_{i2} R_{i3}(L_{i1}+L_{i2})} \quad (27E)$$

In practical circuit designs there will always be some equivalent series resistance in inductor $G_2 L_{i1}$ in FIG. 6A, and for d-c stabilization there must be a resistor shunting capacitor $G_2 C_{i1}$ as in FIG. 6B. Therefore, in practical cases the low-frequency response of these networks will be inaccurate below some finite non-zero frequency.

Figure 7A:
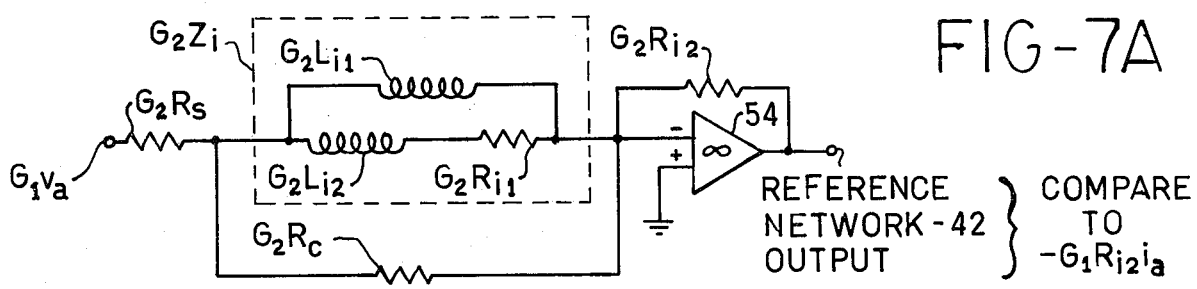
Figure 7B:
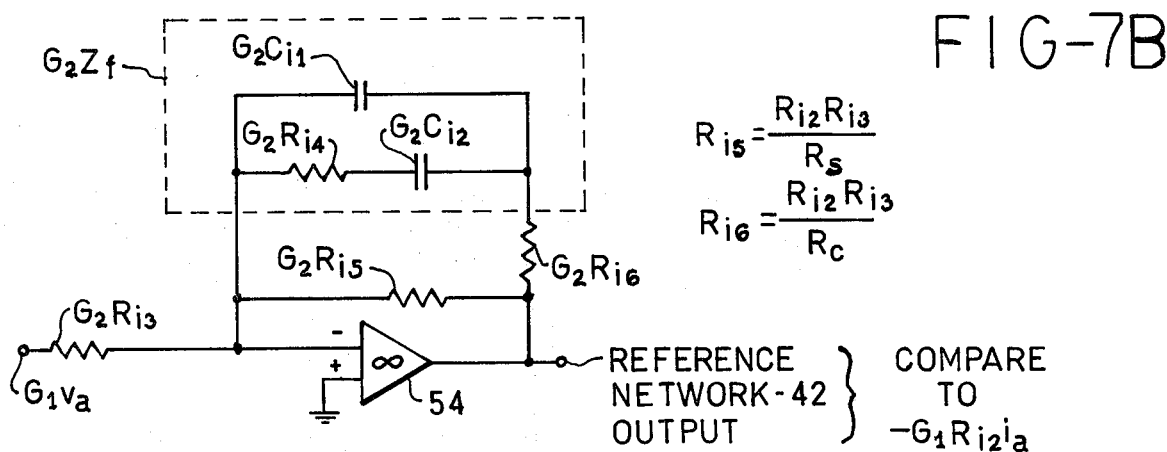

This limitation can be overcome and the circuitry of FIG. 5 eliminated by using the circuits of FIGS. 7A or 7B. The reference network signal in this case would be compared to $i_a$ rather than $i_s$. Since the actual phase shift of $Z_s$ is different from that of $Z_i$ or $1/Z_f$, the magnitudes of the output signals of FIGS. 7A and 7B will be slightly different from the ideal near the circuit break frequencies. However, the error is negligible in most cases. The component values for $Z_i$ and $Z_f$ are calculated from the formulas of FIGS. 6A and 6B. In FIG. 7A the series resistance of $G_2 L_{i1}$ can be compensated for by adjustments in $G_2 R_s$ and $G_2 R_{i1}$.

The invention having been described in detail in accordance with the requirements of the Patent Statutes, various other changes and modifications will suggest themselves to those skilled in this art. For example, the system performance could be improved somewhat by designing the components of FIGS. 6A, 6B, 7A or 7B, depending upon which one is used, so that these components produce the same types of nonlinearity and temperature dependence as is observed in the corresponding motor parameters. For example, the inductors in impedance $G_2 Z_i$ of FIG. 7A could be designed to have core loss and copper loss of the appropriate amount so as to replace some or all of the external resistors $G_2 R_s$, $G_2 R_{i1}$, and $G_2 R_c$, and at the same time the variations in inductor core and copper loss with signal amplitude and temperature could be made to approximate those of the motor. Also, this type of system could be implemented by the use of a small, special-purpose computer with motor input voltage, frequency, and current as inputs to the computer; and the motor voltage control signal as the computer output. It also will be noted that the system of FIGS. 1 and 2 may be used as a component in a phase control servo. It is intended that the above and other such changes and modifications shall fall within the spirit and scope of this invention as defined in the appended claims.

I claim:
1. In an induction motor control system for controlling an induction motor having a stator and a rotor, a variable frequency and amplitude motor drive source for supplying the motor with a controllable frequency and amplitude motor drive voltage, means for controlling the amplitude of the motor drive voltage for effi- cient motor operation over a wide range of rotor speeds and motor loads, said controlling means comprising, electronic means responsive to the motor input current and voltage for producing an error signal related to the difference between motor impedance and motor impedance required for optimum motor operating efficiency, and means responsive to said error signal for controlling the motor input voltage to minimize said difference.

2. In an induction motor control system as defined in claim 1 wherein said electronic means responsive to the motor input current and voltage includes, first means responsive to motor input current for producing a signal that varies as a function of motor impedance, second means responsive to motor input voltage for producing a signal that varies as a function of motor impedance required for optimum motor operating efficiency under existing motor operating conditions, and means responsive to the difference between said signals produced by said first and second signal producing means for producing said error signal for controlling the amplitude of the motor drive voltage.

3. In an induction motor control system as defined in claim 2 wherein said first signal producing means includes means for providing a signal $I_s$ substantially proportional to actual motor current less current loss due to stator core loss resistance.

4. In an induction motor control system as defined in claim 2 wherein said second signal producing means responsive to motor input voltage comprises, means for producing a signal $v_s$ substantially proportional to the amplitude of the motor stator voltage as defined in the transformer equivalent circuit of the induction motor, means including a reference network responsive to said signal $v_s$ for producing a signal $I_s$ (optimum) substantially proportional to the amplitude of motor stator current, as defined in the transformer equivalent circuit of the induction motor, required for maximum efficiency of induction motor operation under existing motor speed and load conditions.

5. In an induction motor control system as defined in claim 4 wherein said first signal producing means responsive to motor input current comprises, means for producing a signal $I_s$ substantially proportional to actual motor current less current loss due to stator core loss resistance, and said means responsive to the difference between said signals is responsive to the difference between said signals $I_s$ and $I_s$ (optimum) for controlling the amplitude of the motor input voltage.

6. In a method of controlling an induction motor having a rotor and stator for optimum efficiency of operation over a wide range of rotor speed and load, said method comprising, deriving from a measure of the motor input current and voltage an error signal which varies as a function of the difference between motor impedance and motor impedance required for optimum motor operating efficiency, and utilizing said error signal to control the amplitude of the motor input voltage for minimizing said difference.

7. In a method of controlling an induction motor as defined in claim 6 which includes deriving said error signal by, electronically producing from a measure of the motor input current and voltage a first signal which varies as a function of motor impedance, electronically producing from a measure of the motor input voltage a second signal which varies as a function of motor impedance required for optimum operating efficiency under existing motor conditions, and sensing the difference between said first and second signals for deriving said error signal for use in controlling the amplitude of the motor drive voltage.

8. In a method of controlling an induction motor as defined in claim 7 wherein said step of electronically producing said first signal includes, producing from a measure of said motor input current a signal $I_s$ substantially proportional to actual motor current less current loss due to stator core loss resistance.

9. In a method of controlling an induction motor as defined in claim 7 wherein said step of electronically producing said first signal includes producing from a measure of said motor input voltage a signal $v_s$ substantially proportional to the amplitude of motor stator voltage as defined in the transformer equivalent circuit of the induction motor, supplying said signal $v_s$ to a reference network to produce a signal $I_s$ (optimum) substantially proportional to the amplitude of the motor stator current, as defined in the transformer equivalent circuit of the induction motor, required for maximum efficiency of induction motor operation under existing speed and load conditions.

10. In a method of controlling an induction motor as defined in claim 9 wherein said step of electronically producing said second signal includes, producing from a measure of said motor input current a signal $I_s$ substantially proportional to actual motor current less current loss due to stator core loss resistance.

11. A motor efficiency controller for use with an induction motor energized by a variable amplitude motor drive source for optimizing the operating efficiency of the motor over a wide range of motor speeds and torques, said controller comprising, means responsive to motor input current and voltage for producing a signal related to motor impedance, means responsive to motor input voltage for producing a signal related to optimum motor impedance required for maximum operating efficiency at the existing motor drive source frequency, and means responsive to the difference between said motor impedance and optimum motor impedance for controlling the motor drive source voltage to minimize the difference between said motor impedance and optimum motor impedance signals.

* * * * *